United States Patent

[11] 3,568,841

[72] Inventor Ken-Ichiro Kurita
　　　　　　36-4-5-Chome, Senriyama-nishi, Suita
　　　　　　Osake Prefecture, Japan
[21] Appl. No. 2,273
[22] Filed Jan. 12, 1970
[45] Patented Mar. 9, 1971

[54] APPARATUS FOR RELEASING FILTER CAKE IN FILTER PRESS
4 Claims, 7 Drawing Figs.

[52] U.S. Cl. .................................................. 210/225, 210/230
[51] Int. Cl. ...................................................... B01d 25/12
[50] Field of Search .......................................... 210/224, 225, 227, 228, 230, 236

[56] References Cited
UNITED STATES PATENTS

| | | | |
|---|---|---|---|
| 699,052 | 4/1902 | Wilson | 210/227 |
| 2,932,399 | 4/1960 | Emele | 210/225 |
| 3,347,384 | 10/1967 | Muller | 210/230X |
| 3,366,243 | 1/1968 | Kurita | 210/225 |

Primary Examiner—Reuben Friedman
Assistant Examiner—C. M. Ditlow
Attorney—McCarthy, Depaoli & O'Brien ABSTRACT: In a filter press of plate-and-frame type which comprises filter plates and filter frames alternately arranged with filter cloth disposed between adjacent surfaces and in which the filter plates are adapted to be separated from the filter frames after filtration, filter frames are supported movably by pivot members on side bars for supporting filter plates and adapted for pivotal movement about the pivot members. Filter cloth attached to the upper end of each filter frame is connected to the lower end of the preceding filter plate while filter cloth attached to the lower end of the filter frame is connected to the upper end of the following filter plate. When the filter plate is separated, the filter frame is thereby pivotally moved into inclined position by being pulled by the filter cloth to permit the cake to drop from the interior of the frame.

Inventor
KEN-ICHIRO KURITA

APPARATUS FOR RELEASING FILTER CAKE IN FILTER PRESS

BACKGROUND OF THE INVENTION

The present invention relates to an apparatus for releasing filter cake in a filter press of plate-and-frame type.

In a conventional filter press of plate-and-frame type, in general, the filter plates and filter frames are arranged alternately in a row with the filter cloth attached either to the filter plates or to the filter frames so that the filter cake may be deposited in the interior of the filter frames. On the other hand, when a liquid of low viscosity is to be treated on a filter press of recessed-plate type the filter cake can be released downward off the filter cloth simply by moving the filter plates one by one with or without giving vibration to the plates while the plates are in transit. The filter press of this type therefore has a relatively high amenability to automatic operation and automatic apparatuses are therefore already in practical use. However, with a filter press of plate-and-frame type for treating a liquid of high viscosity, it is difficult to effect removal of the cake even when the filter plates are forced to separate and for this reason automatic filtering operation on a filter press of such type has not yet been provided.

SUMMARY OF THE INVENTION

An object of the present invention is to provide an apparatus by which when a filter plate is transported the following filter frame adjacent thereto is automatically inclined so as to allow the cake to drop from the filter frame spontaneously.

The present invention is characterized by a structure in which the filter plates and filter frames are connected together in various manners so that when a filter plate is moved the following filter frame may be automatically turned into inclined position thereby permitting filter cake to get removed and drop from the filter frame thus released even when filter cloth is hung on the frame.

In accordance with the present invention filter cake can be removed and dropped from filter frames automatically and easily in a filter press of plate-and-frame type in which it has been considered difficult to effect such operation automatically. The invention has a further advantage that this can be ensured with a very simple structure.

DESCRIPTION OF THE PREFERRED EMBODIMENTS

Figure 1:
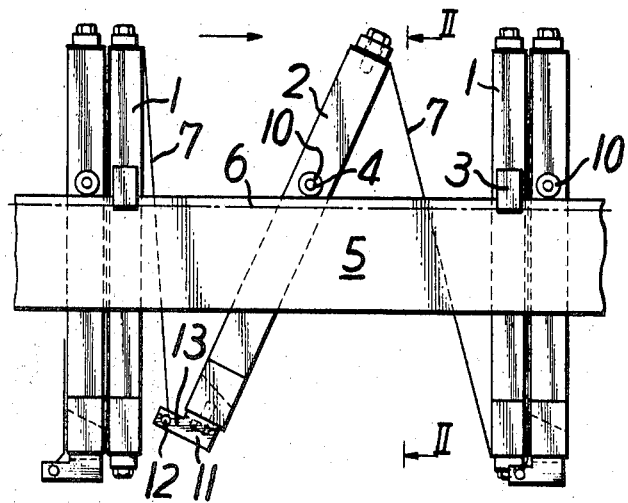
FIG. 1 is a side elevation showing the principal part of an embodiment in accordance with the present invention.
Figure 2:
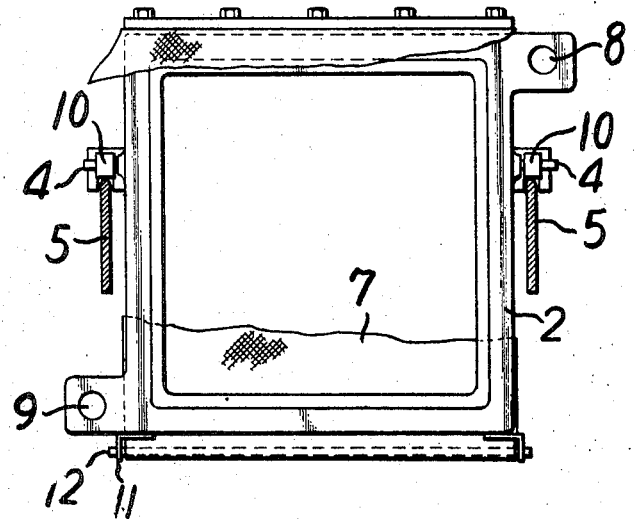
FIG. 2 is a front view along the line II–II of in FIG. 1.
Figure 3:
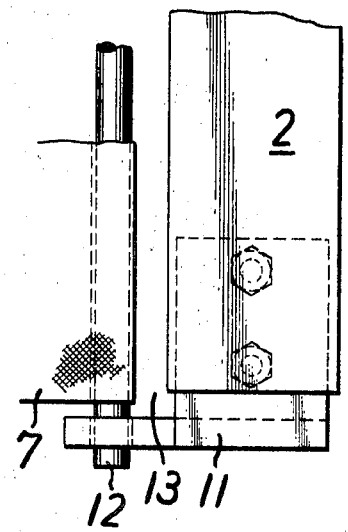
FIG. 3 is a fragmentary front view.
Figure 4:
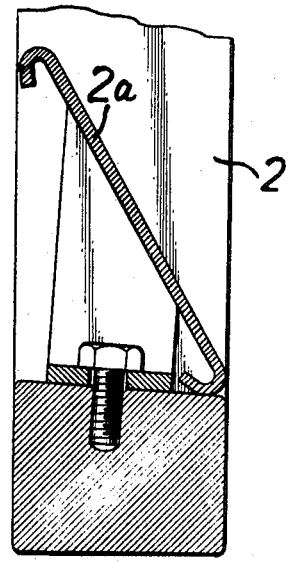
FIG. 4 is a fragmentary sectional view.

Referring to the embodiment shown in FIG. 1, designated at 1 are filter plates, each being provided with handles 3 on opposite sides. Numeral 2 indicates a filter frame which is provided with pivot members on the opposite sides. Indicated at 5 are side bars disposed along the opposite sides of a group of filter plates 1 and filter frames 2 in parallel relationship with each other. The side bars 5 are supported on the base frame (not shown) at their opposite ends. The filter plates 1 and filter frames 2 are respectively supported on the side bars 5 at the handles 3 and pivot members 4 in movable manner. The respective filter plates 1 are adapted to be transported one by one automatically, for instance, by means of chains 6 which have feed nails or the like. Since the machine body and transport means are those already known in the art, the explanation will be omitted. Designated at 7 is filter cloth whose one end is fixed to the lower end of the filter plate 1, the other end thereof being secured to the upper end of the following filter frame 2. The lower end of the next sheet of the filter cloth 7 is fixed to the lower end of the same filter frame 2 and the other end to the upper end of the following filter plate 1. Accordingly, the filter plates 1 and filter frames 2 are connected by means of the filter cloth 7. Designated at 8 is an inlet for prefilt and at 9 a common hole serving as a filtrate exit. Each of the pivot members 4 is provided with a roller 10 which serves to reduce the friction on the side bars 5 when the filter plates are moved. As will be described later, the roller 10 serves as a support to permit the filter frame 2 to incline. Attached to the lower end of the filter frame 2 is a pair of L-shaped holders 11 on which a filter cloth rod 12 is mounted in parallel to the lower end of the filter frame 2 and spaced apart therefrom by a slight clearance 13. The filter cloth 7 is fixed in position by passing the filter cloth rod 12 through a baglike portion formed at the lower end of the filter cloth 7.

The operation of the embodiment above will be described. When one filter plate 1 is moved toward the movable end plate (not shown), the following filter frame 2 is pulled by the filter cloth 7 at its upper portion to incline as shown in FIG. 1 and simultaneously with this, the filter cloth 7 is detached from the filter plate 1 and filter frame 2. As a result, the filter cake in the filter frame 2 is automatically released to drop. When the next filter plate 1 is sent forward, the inclined filter frame 2 is brought back to the upright position and forwarded by being pushed by the filter plate 1. In the case where fragments of cake should drop between the lower portion of the inclined filter frame 2 and the filter cloth 7 attached to the following filter plate 1, the cake does not get in between the lower portion along the back face of the filter frame 2 and the filter cloth 7 but falls through the clearance 13.

The automatic transport means for the filter plates 1, being already known in a the art, will not be illustrated. In order to ensure satisfactory removal of cake when the filter frame 2 is inclined, the filter frame 2 is provided with a slanting guide member 2a along the inner edge portion of the frame. With the provision of the guide member 2a, hardly any cake is caught on the periphery of the frame 2, with the result that cake is dropped with the efficiency of nearly 100 percent.

Figure 5:
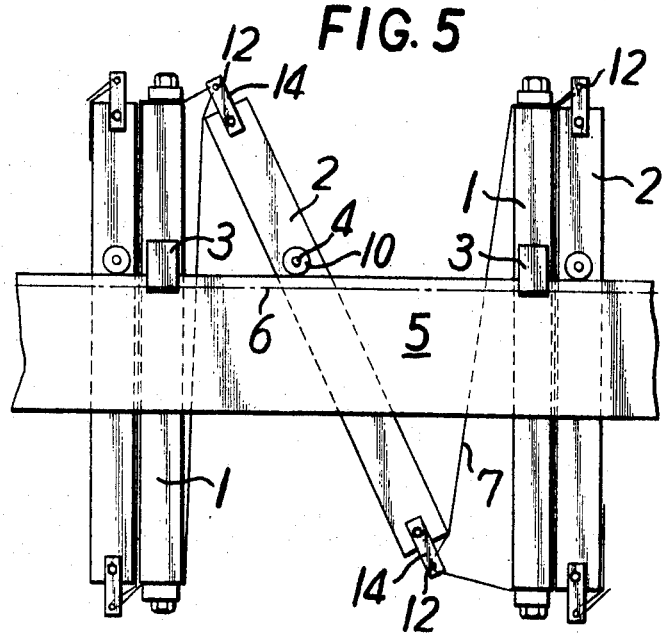
FIG. 5 is a side elevation showing a modified embodiment.

In the embodiment shown in FIG. 5, the filter frame 2 is provided with filter cloth rods 12 mounted by holders 14 along its upper and lower ends and slightly spaced apart therefrom. The filter cloth 7 is attached to the filter plates 1 by being passed around the rods 12. The filter cloth 7 attached to each filter plate 1 is hung on one of the filter cloth rods 12 on the following filter frame 2 and the filter cloth 7 attached to the next-positioned filter plate 1 adjacent to this frame 2 is hung on the other filter cloth rod 12, the respective filter plates 1 and filter frames 2 thus being connected by the filter cloth 7.

When one filter plate 1 is forwarded by being drawn by the filter cloth 7, the following filter frame 2 is inclined and the cake filled in the frame is thereby removed automatically to drop therefrom just as in the foregoing embodiment. The inclination of the filter frame 2 both in the present and foregoing embodiments is effected by the movement of the filter plate 1, because one end of the frame 2 is pulled by the forwardly moving filter plate 1 while the other end thereof is retained in the same position by the following adjacent filter plate 1 which is in fixed position.

Figure 7:
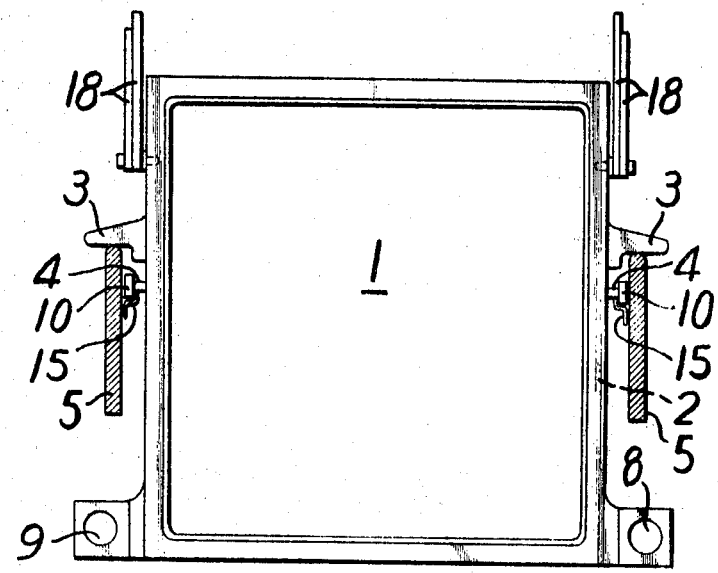
FIG. 7 is a front view of FIG. 6.

Referring to the embodiment in FIG. 7, the side bars 5 for supporting the filter plates 1 and filter frames 2 are provided on their inner sides with rails 15 on which rollers 10 on the opposite sides of the filter plates 2 are mounted. Chains or cables 23 extend between projection 16 and projections 17 respectively formed on the opposite sides of the filter plates 1 and filter frames 2. Attached to the upper side portions of each two adjacent filter plates 1 disposed in the front and rear of the filter frame 2 are ends of inversed V-shaped first links 18 whose upper ends are pivotally connected by pins 20. Also attached to the pins 20 of the links 18 are the upper ends of shorter second links 19 whose lower ends are connected to the upper side portions of the filter frame 2 between the filter plates 1. Pins 21 and 22 serve to connect the links 18 and 19 to the filter plate 1 and filter frame 2 respectively.

In accordance with the present embodiment, when the filter plate 1 is moved rightward in the drawing, the first links 18 whose upper ends are pivotally connected by pins 20 to each other between the moved filter plate 1 and the following filter plate 1 in fixed position are brought into open position in inversed V-shape as shown in the drawing, while the chains or cables 23 extending between the projections 16 and the projections 17 provided on the opposite sides of the filter plates 1 and filter frames 2 are stretched tensely by the preceding filter plate 1 to draw the middle portions at the opposite sides of the filter frame 2.

On the other hand, the pin 20 on the first links 18 and the link 19 connected to the upper portion of the filter frame 2 serve to support the upper portion of the frame 2 in staylike manner, so that the filter frame 2 is forced to incline as illustrated in the drawing and thereby cause the cake deposited therein to drop for removal. When the removal of cake in one filter frame 2 is finished due to the movement described above, the following filter plate 1 is automatically moved rightward in the drawing. As the following filter plate 1 approaches the preceding one, the respective links are gradually brought into closed position to bring the inclined filter frame 2 back to the upright position while allowing the filter frame 2 to move forward on the rollers 10 which roll on the rails 15. At this time, the chains or cables 23 stretched tautly between the filter frame 2 and filter plate 1 are slackened gradually.

Figure 6:
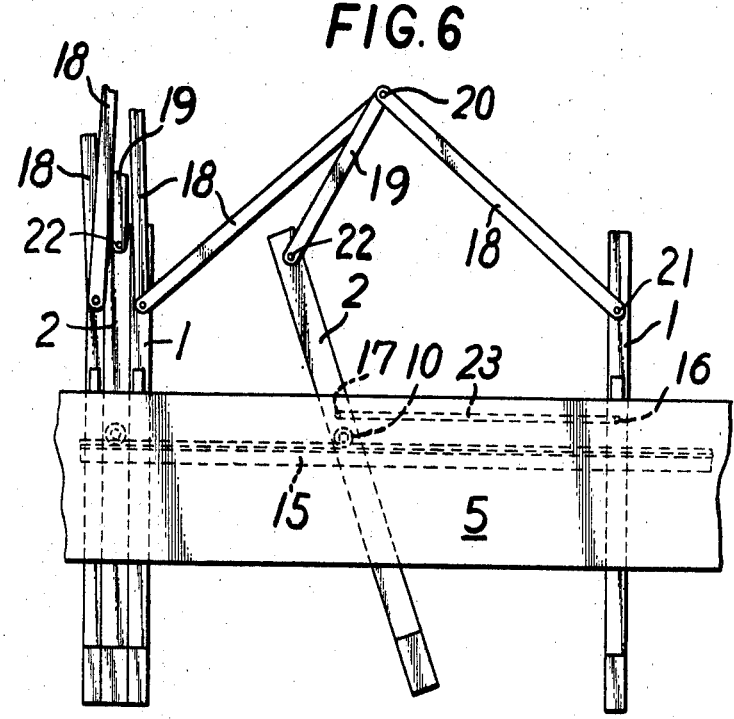
FIG. 6 is a side elevation showing another embodiment.

When the following filter plate 1 is completely transported in this manner, the following filter frame 2 adjacent to the plate 1 is then forced to move into predetermined inclined position by the links 18 and link 19. Since the embodiment in FIG. 6 is characterized in that the filter frame is inclined not by filter cloth but by the links and chains or cables, such embodiment is fit for a filter press employing a filter cloth which is not high enough in tensile stress to force the filter frame to incline.

I claim:

1. In a filter press of plate-and-frame type comprising filter plates and filter frames arranged alternately in a row supported on support means and connected together by suitable link members so that when one filter plate is moved the following adjacent filter frame may be inclined by said link members between said filter plate and another filter plate in fixed position to allow filter cake to release and drop from said filter frame, an apparatus for releasing filter cake characterized in that said filter plates and filter frames are connected to each other by filter cloth in such manner that one end of a piece of said filter cloth is fixed to the lower end of one filter plate with the other end thereof secured to the upper end of the following filter frame and that the lower end of the next piece of said filter cloth is fixed to the lower end of the same filter frame with the other end thereof secured to the upper end of the following filter plate, said filter frames being supported on side bars and adapted to the moved and inclined thereon.

2. The apparatus for releasing filter cake in a filter press of plate-and-frame type as claimed in claim 1 wherein filter cloth rods are provided respectively at the upper and lower portions of each of said filter frames and the filter cloth attached to a preceding adjacent filter plate is hung on one of said rods while the filter cloth attached to a following adjacent filter plate is hung on the other rod so as to enable said filter frames to be moved and inclined on said side bars.

3. The apparatus for releasing filter cake in a filter press of plate-and-frame type as claimed in claim 1 wherein the inner bottom surfaces of said filter frames are formed as slanting planes.

4. In a filter press of plate-and-frame type comprising filter plates and filter frames arranged alternately in a row supported on support means and connected together by suitable link members so that when one filter plate is moved the following adjacent filter frame may be inclined by said link members between said filter plate and another filter plate in fixed position to allow filter cake to release and drop from said filter frame, an apparatus for releasing filter cake characterized in that chains are provided between projections formed on the opposite sides of said filter plates and filter frames and that links are pivotally connected to the upper portions of said filter plates and filter frames, each two adjacent filter plates and the filter frame therebetween each having a pivotal link extending therefrom with the extreme ends of said lengths being pivotally connected together on a pin, said links being so constructed and arranged that each link connected to each frame causes the frame to become inclined when the leading plate associated therewith is moved away.